US012392912B2

(12) United States Patent
Miyao et al.

(10) Patent No.: US 12,392,912 B2
(45) Date of Patent: Aug. 19, 2025

(54) SCINTILLATOR PANEL, RADIATION DETECTOR, RADIATION INSPECTION DEVICE, AND METHOD FOR PRODUCING SCINTILLATOR PANEL

(71) Applicant: Toray Industries, Inc., Tokyo (JP)

(72) Inventors: Sho Miyao, Otsu (JP); Yasuhiro Kobayashi, Otsu (JP); Takahiro Tanino, Otsu (JP)

(73) Assignee: Toray Industries, Inc., Tokyo (JP)

( * ) Notice: Subject to any disclaimer, the term of this patent is extended or adjusted under 35 U.S.C. 154(b) by 225 days.

(21) Appl. No.: 18/036,722

(22) PCT Filed: Dec. 17, 2021

(86) PCT No.: PCT/JP2021/046733
§ 371 (c)(1),
(2) Date: May 12, 2023

(87) PCT Pub. No.: WO2022/138489
PCT Pub. Date: Jun. 30, 2022

(65) Prior Publication Data
US 2023/0408711 A1  Dec. 21, 2023

(30) Foreign Application Priority Data
Dec. 25, 2020  (JP) .................. 2020-216345

(51) Int. Cl.
*G01T 1/20*  (2006.01)
(52) U.S. Cl.
CPC .......... *G01T 1/2012* (2013.01); *G01T 1/2002* (2013.01)
(58) Field of Classification Search
CPC . G01T 1/2012; G01T 1/2002; G01T 1/20183; G01T 1/2023; G21K 2004/06; G21K 4/00
See application file for complete search history.

(56) References Cited

U.S. PATENT DOCUMENTS 9,684,082 B2  6/2017  Okamura et al.
9,684,083 B2  6/2017  Okamura et al.
(Continued)

FOREIGN PATENT DOCUMENTS

JP  2002-139568 A    5/2002
JP  2009222578 A  * 10/2009
(Continued)

OTHER PUBLICATIONS

Shigeta et al., "High Spatial Resolution Performance of Pixelated Scintillators", Progress in Biomedical Optics and Imaging, SPIE—International Society for Optical Engineering, (Mar. 3, 2017), vol. 10132, pp. 101323Y-1-101323Y-6.
(Continued)

*Primary Examiner* — Edwin C Gunberg
*Assistant Examiner* — Richard O Toohey
(74) *Attorney, Agent, or Firm* — Buchanan Ingersoll & Rooney PC (57) ABSTRACT

Disclosed is a scintillator panel comprising a substrate, a grid-like barrier rib formed on the substrate, a phosphor layer in cells divided by the barrier rib, and a reflective layer surrounding the side and the bottom of the phosphor layer, the scintillator panel comprising a part where the reflective layer surrounding the side of the phosphor layer is curved and a part where opposing surfaces of the reflective layer at the side of the phosphor layer are approximately parallel, wherein a ratio in a width direction of a part where the reflective layer at the bottom of the phosphor layer is curved to a part where the reflective layer at the bottom of the phosphor layer is flat is 10.0:0 to 1.0:9.0. The brightness of the scintillator panel is improved.

9 Claims, 4 Drawing Sheets

(56) References Cited

U.S. PATENT DOCUMENTS

| | | | | |
|---|---|---|---|---|
| 2008/0054182 A1* | 3/2008 | Yokoyama | ............. | G03B 42/04 |
| | | | | 378/189 |
| 2016/0170042 A1* | 6/2016 | Den | ......................... | G01T 1/20 |
| | | | | 250/368 |
| 2020/0408936 A1 | 12/2020 | Tanino et al. | | |
| 2021/0088677 A1 | 3/2021 | Kameshima | | |

FOREIGN PATENT DOCUMENTS

| | | | | |
|---|---|---|---|---|
| JP | 2017067681 A | 4/2017 | | |
| JP | 2019020336 A | 2/2019 | | |
| KR | 20180136430 A * | 12/2018 | ........... | G01T 1/2002 |
| WO | 2014054422 A1 | 4/2014 | | |

OTHER PUBLICATIONS

The extended European Search Report issued Nov. 6, 2024, by the European Patent Office in corresponding European Patent Application No. 21910634.1-1001. (9 pages).

International Search Report and Written Opinion for International Application No. PCT/JP2021/046733, dated Feb. 22, 2022, 7 pages.

* cited by examiner

SCINTILLATOR PANEL, RADIATION DETECTOR, RADIATION INSPECTION DEVICE, AND METHOD FOR PRODUCING SCINTILLATOR PANEL

CROSS REFERENCE TO RELATED APPLICATIONS

This application is the U.S. National Phase of PCT/JP2021/046733, filed Dec. 17, 2021, which claims priority to Japanese Patent Application No. 2020-216345, filed Dec. 25, 2020, the disclosures of these applications being incorporated herein by reference in their entireties for all purposes.

FIELD OF THE INVENTION

The present invention relates to a scintillator panel, a radiation detector, a radiation inspection device, and a method for producing a scintillator panel.

BACKGROUND OF THE INVENTION

Heretofore, radiological images using films have been widely used in medical settings. However, the radiological images using films provide analog image information.

Therefore, in recent years, digital radiation detectors such as flat panel radiation detectors (hereinafter abbreviated as "FPDs") have been developed. In FPDs, a scintillator panel is used for converting radiation into visible light. The scintillator panel includes radiosensitive phosphors and the radiosensitive phosphors emit visible light in response to applied radiation. The emitted light is converted into electrical signals by a thin film transistor (TFT) or a charge-coupled device (CCD), thus resulting in conversion of radiation information into digital image information. However, the scintillator panel have a problem that the light emitted from the radiosensitive phosphors scatter in a layer containing phosphors (phosphor layer), leading to deterioration of the image sharpness.

Therefore, in order to reduce the influence of scattering of the emitted light, there have been proposed cell-type scintillator panels in which phosphors are filled into spaces divided by barrier ribs including a reflective layer on the surface, that is, cells. As a result, scattering of light emitted from the phosphors is suppressed by the barrier ribs, and thus X-ray images with high sharpness can be obtained.

Meanwhile, because of including barrier ribs, the cell-type scintillator panel has a problem that the amount of the phosphor decreases, leading to deterioration of the brightness. There has been known, as one of methods for improving the brightness, a method in which the phosphor layer is surrounded with a reflective surface having a light-collecting shape such as a hemispherical shape in order to reduce the number of times of reflection of light, emitted in the cells, at the barrier ribs, thereby suppressing light decay (Patent Document 1).

There has also been proposed a cell-type scintillator panel including barrier ribs having a shape with a high aspect ratio in order to increase the amount of the phosphor to be filled into the cells (Patent Document 2).

PATENT DOCUMENTS

Patent Document 1: JP 2017-67681 A
Patent Document 2: WO 2014/054422

SUMMARY OF THE INVENTION

However, in Patent Document 1, the barrier ribs need to have a shape with no parallel surfaces, such as a hemispherical shape, thus resulting in small amount of the phosphor in cells and insufficient brightness. Patent Document 2 mentions a form in which the bottom of the barrier ribs has a curved part, but there was less curved part, so that the emitted light did not efficiently travel to a detector due to reflection by a reflective layer on the barrier rib surface, thus resulting in insufficient brightness.

In view of these conventional problems, the present invention has been made and an object thereof is to improve the brightness of a scintillator panel.

In order to solve the above problems, the present invention mainly has the following configuration.

A scintillator panel comprising a substrate, a grid-like barrier rib formed on the substrate, a phosphor layer in cells divided by the barrier rib, and a reflective layer surrounding the side and the bottom of the phosphor layer, the scintillator panel comprising a part where the reflective layer surrounding the side of the phosphor layer is curved and a part where opposing surfaces of the reflective layer at the side of the phosphor layer are approximately parallel, wherein a ratio in a width direction of a part where the reflective layer at the bottom of the phosphor layer is curved to a part where the reflective layer at the bottom of the phosphor layer is flat is 10.0:0 to 1.0:9.0.

According to the present invention, it is possible to improve the brightness of a scintillator panel.

DETAILED DESCRIPTION OF EMBODIMENTS OF THE INVENTION (Scintillator Panel)

Embodiments of the present invention of the scintillator panel according to the present invention will be described with reference to the drawings. The present invention is not limited to the embodiments described below.

Figure 1:
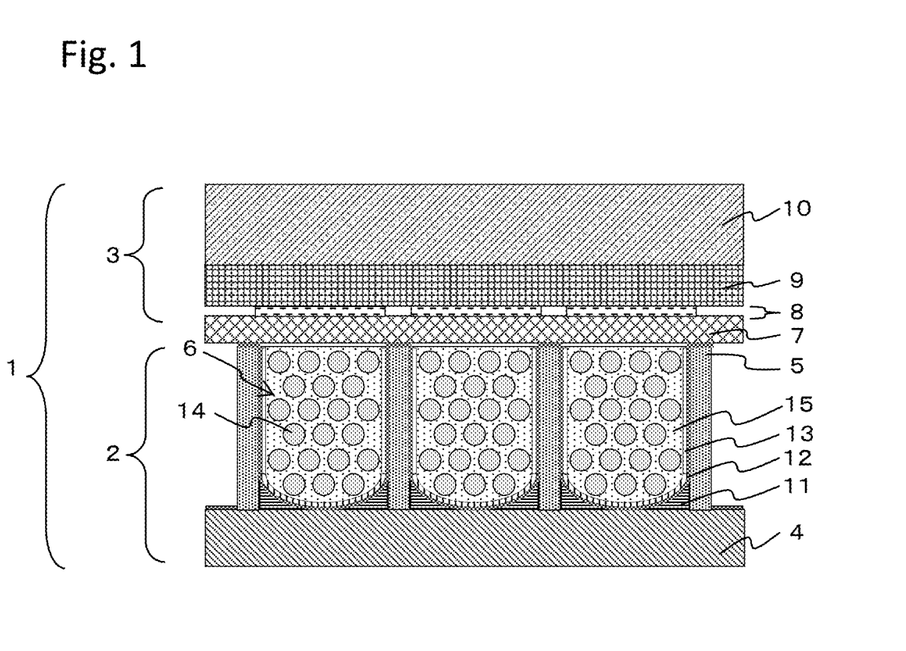
FIG. 1 is a sectional view schematically showing a radiation detector member including a scintillator panel according to one embodiment of the present invention.

FIG. 1 is a sectional view schematically showing a radiation detector member 1 including a scintillator panel 2 according to the embodiment of the present invention. The radiation detector member 1 includes the scintillator panel 2 and an output substrate 3. The scintillator panel 2 includes a substrate 4, barrier ribs 5, and a phosphor layer 6. The phosphor layer 6 is filled into cells divided by the barrier ribs 5. In the phosphor layer 6, phosphors 14 and a binder resin 15 are included. On a surface of the barrier rib 5, a reflective layer 12 is formed. Between the barrier rib 5 and the reflective layer 12, there may be a part where a partition auxiliary layer 11 is provided. A protective layer 13 may be provided on a surface of the reflective layer 12. The output substrate 3 includes a substrate 10, an output layer 9 formed on the substrate 10, and a photoelectric conversion layer 8. The photoelectric conversion layer 8 includes photodiodes and is formed on the output layer 9. A diaphragm layer 7 may be provided on the photoelectric conversion layer 8. It is preferable that the light exit surface of the scintillator panel 2 and the photoelectric conversion layer 8 of the output substrate 3 are bonded or adhered to each other with the diaphragm layer 7 interposed therebetween. The light emitted from the phosphor layer 6 reaches the photoelectric conversion layer 8 and is photoelectrically converted, and then outputted. The components will be described respectively.

(Substrate)

The material constituting the substrate 4 is preferably a radiotransparent material. Examples of the material constituting the substrate 4 include various glasses, polymer materials, metals and the like. Examples of the glass include quartz, borosilicate glass, chemically strengthened glass and the like. Examples of the polymer material include cellulose acetate, polyesters such as polyethylene terephthalate, polyamides, polyimides, triacetates, polycarbonates, carbon fiber reinforced resins and the like. Examples of the metal include aluminum, iron, copper and the like. These materials may be used in combination. Particularly, the material constituting the substrate 4 is preferably a polymer material having high radiotransparency. The material constituting the substrate 4 is preferably a material excellent in flatness and heat resistance.

When using a glass substrate, the thickness of the substrate 4 is preferably 2.0 mm or less, more preferably 1.0 mm or less, and still more preferably 0.5 mm or less, from the viewpoint of weight reduction of the scintillator panel. In the case of a substrate made of a polymer material, the thickness is preferably 3.0 mm or less, and more preferably 1.0 mm or less. The thickness of the substrate 4 can be determined as follows: the cross-section of the substrate is cut out using a microtome, and the cut cross-section is observed at 10 points each using a scanning electron microscope (for example, a field emission scanning electron microscope "S-4800" manufactured by Hitachi, Ltd.), and then an average thickness is measured.

(Barrier Rib)

The barrier rib 5 is formed on the substrate 4 and has a grid-like shape, and is provided to form divided spaces (cells). Therefore, X-ray images with high sharpness can be obtained by matching the size and pitch of pixels of the photoelectric conversion layer 8 arranged in a grid pattern on the output substrate 3 with the size and pitch of cells of the scintillator panel 2.

The material constituting the barrier rib 5 is preferably a material capable of forming a barrier rib with high strength and heat resistance, for example, an inorganic material, a polymer material or the like. Particularly, a material composed mainly of a polymer material is preferable from the viewpoint of the flatness and the workability of the side of the barrier rib. As used herein, "composed mainly of a polymer material" means that 50 to 100% by mass of the material constituting the barrier rib is a polymer material.

"Inorganic material" refers to a compound composed of elements other than carbon. However, some simple carbon compounds (allotropes of carbon, such as graphite or diamond) are included in the inorganic material.

When the material constituting the barrier rib 5 is an inorganic material, it is preferable to use glass as a main component. The glass refers to inorganic amorphous solid containing silicate. When the main component of the barrier rib 5 is glass, the strength, the durability, and the heat resistance of the barrier rib are enhanced, and thus deformation and damage are less likely to occur during the step of forming a reflective layer and the step of filling a phosphor. In the strict sense, "composed of inorganic substance" does not exclude the presence of components other than the inorganic substance, and it is acceptable to contain components other than the inorganic substance, such as impurities contained in the inorganic substance itself as a raw material, or components other than the inorganic substance, such as impurities to be mixed during the process of producing the partition wall 5. "Composed mainly of glass" means that 50 to 100% by mass of the material constituting the barrier rib is glass.

Particularly, in the barrier rib, a ratio of the low softening point glass, which is glass having a softening point of 650° C. or lower, is preferably 95 parts by volume or more, and more preferably 98 parts by volume or more, when the volume of the barrier ribs is 100 parts by volume.

Examples of the component which can be used as the component other than the low softening point glass include high softening point glass powder, ceramic powder and the like, which are composed of glass having a softening point exceeding 650° C. These powders make it easier to adjust the shape of the barrier rib during the barrier rib formation step. In order to increase the content of the low softening point glass, the content of the component other than the low softening point glass is preferably less than 5 parts by volume.

When the material constituting the barrier rib 5 is a polymer material, the barrier rib preferably contains one or more compounds (P) selected from the group consisting of polyimide, polyamide, polyamideimide and polybenzoxazole (hereinafter sometimes simply referred to as "compound (P)"). When the barrier rib contains the compound (P), it is possible to form a fine barrier rib with a high aspect ratio and smooth surface.

When the compound (P) has a phenolic hydroxyl group, it is possible to obtain moderate solubility in an alkaline developing solution of the resin, so that high contrast between the exposed and unexposed areas can be obtained to form a desired pattern, which is preferable.

When the barrier rib 5 contains the compound (P), the barrier rib 5 preferably further contains an epoxy compound. Since the epoxy compound can further improve the workability without impairing the heat resistance and the mechanical strength of the compound (P), it becomes easier to form a barrier rib with a desired shape. As a result, the filling amount of the phosphor can be further increased to further improve the brightness.

In order not to impair the properties of the compound (P), the content of the epoxy compound in the barrier rib 5 preferably does not exceed 2.0 times the content of the compound (P) in a mass fraction. When the barrier rib contain the component other than the compound (P) and the epoxy compound, the total content thereof preferably does not exceed the total mass fraction of the compound (P) and the epoxy compound.

Known epoxy compounds can be used, and aromatic epoxy compounds, alicyclic epoxy compounds and aliphatic epoxy compounds are included.

(Barrier Rib Auxiliary Layer)

It is preferable to include a barrier rib auxiliary layer 11 between the barrier rib 5 and a reflective layer 12 mentioned later. By including the barrier rib auxiliary layer, it is possible to easily form a part where the reflective layer surrounding the side and the bottom of the phosphor layer is curved, when the reflective layer is formed on the surfaces of the barrier rib and the barrier rib auxiliary layer by using a method mentioned later. The barrier rib auxiliary layer 11 is preferably in contact with at least part of the barrier rib and the substrate.

The material constituting the barrier rib auxiliary layer 11 preferably has the strength, the chemical resistance, the heat resistance and the radiotransparency, and is preferably a polymer material. Examples of the polymer material used for the barrier rib auxiliary layer 11 include, but are not particularly limited to, thermoplastic resins, thermosetting resins, photocurable resins and the like. More specifically, examples of the polymer material include acrylic resins, cellulose-based resins, polysiloxane resins, epoxy resins, melamine resins, phenol resins, urethane resins, urea resins, vinyl chloride resins, polyester resins such as polyethylene terephthalate and polyethylene naphthalate, polyimide resins, polyamide resins, polyethylene, polypropylene, polystyrene, polyvinyltoluene, polyphenylbenzene and the like. Two or more types thereof may be contained. Of these, thermosetting resins and photosetting resins are preferable from the viewpoint of the strength, the chemical resistance and the heat resistance. Specifically, preferred are resins selected from acrylic resins, polysiloxane resins, epoxy resins, melamine resins, phenol resins, urethane resins, urea resins, polyester resins such as polyethylene terephthalate and polyethylene naphthalate, polyimide resins, and polyamide resins. More preferred are resins selected from polysiloxane resins, epoxy resins, polyimide resins, and polyamide resins. The polymer material constituting the barrier rib auxiliary layer 11 may be the same material as that of the barrier rib.

The barrier rib auxiliary layer 11 may further contain a filler. Examples of the material constituting the filler include, but are not particularly limited to, glass, polymer materials, metal oxides, metal nitrides and the like. Examples of the glass include quartz, borosilicate glass and the like. Examples of the polymer material include acrylic resins, silicone resins, melamine resins, phenol resins, epoxy resins, polyester resins, polyamide resins, polyimide resins, triacetate, polycarbonate, polyethylene, polypropylene, polystyrene, carbon fiber reinforced resins and the like. The polymer material used as the filler is a material different from that of the auxiliary barrier rib layer. Specifically, it is a polymer material in which at least one of the main chain structure, the number-average molecular weight, the weight-average molecular weight and the glass transition point is different from that of the barrier rib auxiliary layer. Examples of the metal oxide include aluminum oxide, silicon oxide, titanium oxide, zirconium oxide, zinc oxide and the like. Examples of the metal nitride include aluminum nitride, silicon nitride, titanium nitride and the like. Two or more types thereof may be used in combination.

(Reflective Layer)

The scintillator panel of the present invention includes a reflective layer 12 surrounding the side and the bottom of the phosphor layer 6. By including the reflective layer 12, the light emitted in cells divided by the barrier rib due to irradiation with radiation efficiently reach a detector, thus enabling an improvement in brightness. As used herein, "reflective layer 12 surrounds the side and the bottom of the phosphor layer 6" means a state where the reflective layer 12 exists on the side and the bottom of the phosphor layer 6. Note that the reflective layer 12 is not limited to a continuous state, and the presence of a locally discontinuous part of the reflective layer 12 due to defects or the like is acceptable.

The material constituting the reflective layer 12 is not particularly limited as long as it has the function of reflecting electromagnetic waves emitted from the phosphor. Examples thereof include metal oxides such as titanium oxide and aluminum oxide; metals such as silver and aluminum, and metals such as alloys containing them. Two or more types thereof may be included.

The material constituting the reflective layer 12 preferably has a high reflectivity even if it is a thin film. By using the thin film, a decrease in internal volume of the cell can be suppressed to increase the amount of the phosphor to be filled, and thus the brightness of the scintillator panel can be easily improved. Therefore, the reflective layer 12 is preferably made of metal, and more preferably a material which is selected from metals selected from silver and aluminum, and alloys containing them. A silver alloy containing palladium and copper is preferable from the viewpoint of the discoloration resistance in the air.

The thickness of the reflective layer 12 can be appropriately set according to the required reflection properties, and is not particularly limited. For example, the thickness of the reflective layer is preferably 10 nm or more, and more preferably 50 nm or more. The thickness of the reflective layer 12 is preferably 500 nm or less, and more preferably 300 nm or less. Since the thickness of the reflective layer 12 provided on the barrier rib 5 is 10 nm or more, the scintillator panel can obtain sufficient light-shielding properties by suppressing leakage of light through the barrier rib, and as a result, the image sharpness is improved. When the thickness of the reflective layer 12 is 500 nm or less, the irregularity on the surface of the reflective layer 12 is less likely to increase and the reflectivity is less likely to decrease.

The reflective layer 12 preferably has a protective layer 13 on its surface, which will be mentioned later. Even if the reflective layer 12 is made of an alloy having poor resistance to discoloration in the atmosphere, discoloration of the reflective layer 12 can be reduced by providing the protective layer 13. A decrease in reflectivity of the reflective layer 12 due to the reaction between the reflective layer 12 and the phosphor layer 6 is suppressed, leading to further improvement in brightness.

Figure 3:
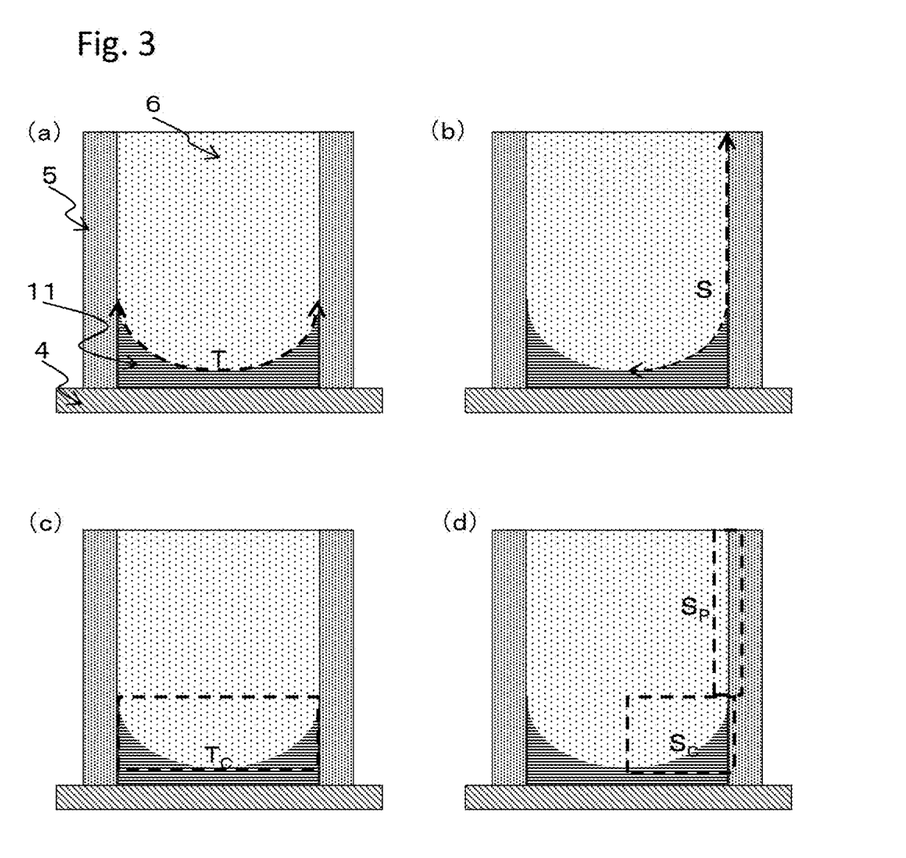
FIG. 3 is a sectional view showing one example of a scintillator panel of the present invention.
Figure 4:
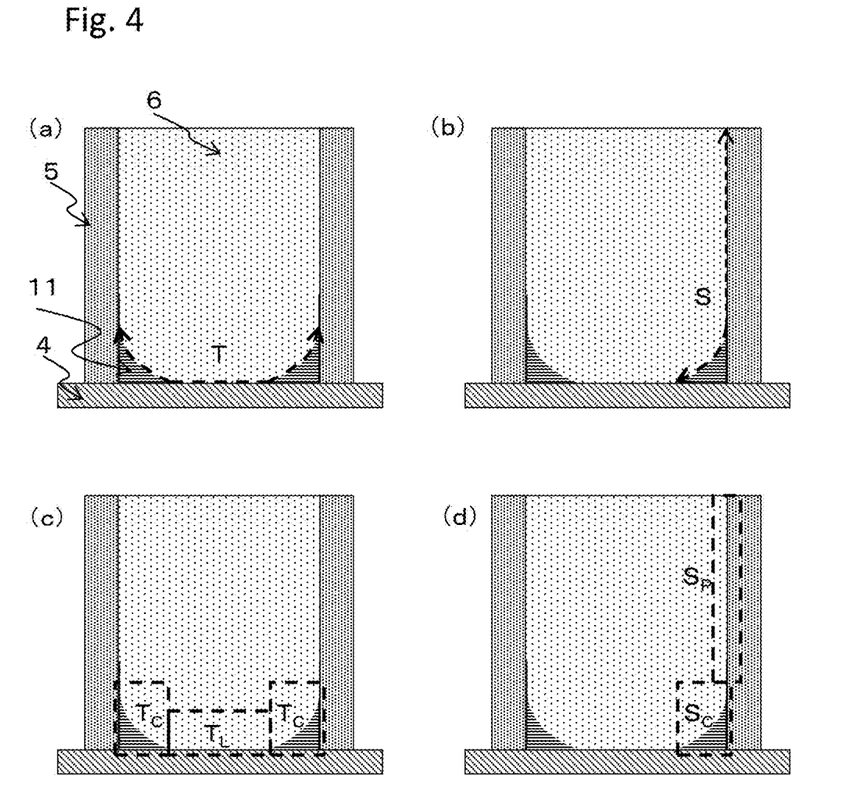
FIG. 4 is a sectional view showing another example of a scintillator panel of the present invention.

As shown in FIGS. 3 and 4, the scintillator panel of the present invention includes a part $S_C$ where the reflective layer surrounding the side S of the phosphor layer 6 is curved and a part $S_P$ where opposing surfaces of the reflective layer at the side S of the phosphor layer 6 are approximately parallel. The ratio in a width direction of a part $T_C$ where the reflective layer at the bottom T of the phosphor layer 6 is curved to a part $T_L$ where the reflective layer is flat is 10.0:0 to 1.0:9.0. As used herein, "ratio in a width direction of a part $T_C$ where the reflective layer at the bottom of the phosphor layer is curved to a part $T_L$ where the reflective layer is flat" refers to a ratio of the length of the part corresponding to the curved part $T_C$ and the length of the part corresponding to the flat part $T_L$ in the projection obtained when the reflective layer is projected onto the plane forming the substrate surface. That is, the scintillator panel of the present invention includes the part $S_P$ where opposing surfaces are approximately parallel and the part $S_C$ which is curved, in the reflective layer including the side S of the phosphor layer, and also includes the curved part $T_C$ within a certain range in the width direction, in the reflective layer at the bottom T of the phosphor layer. As shown in FIGS. 3 and 4, $S_C$ and $T_C$ are actually the same site, and when viewed as the side of the phosphor layer 6, they are referred to as $S_C$, and when viewed as the bottom of the phosphor layer 6, they are referred to as $T_C$.

Figure 2:
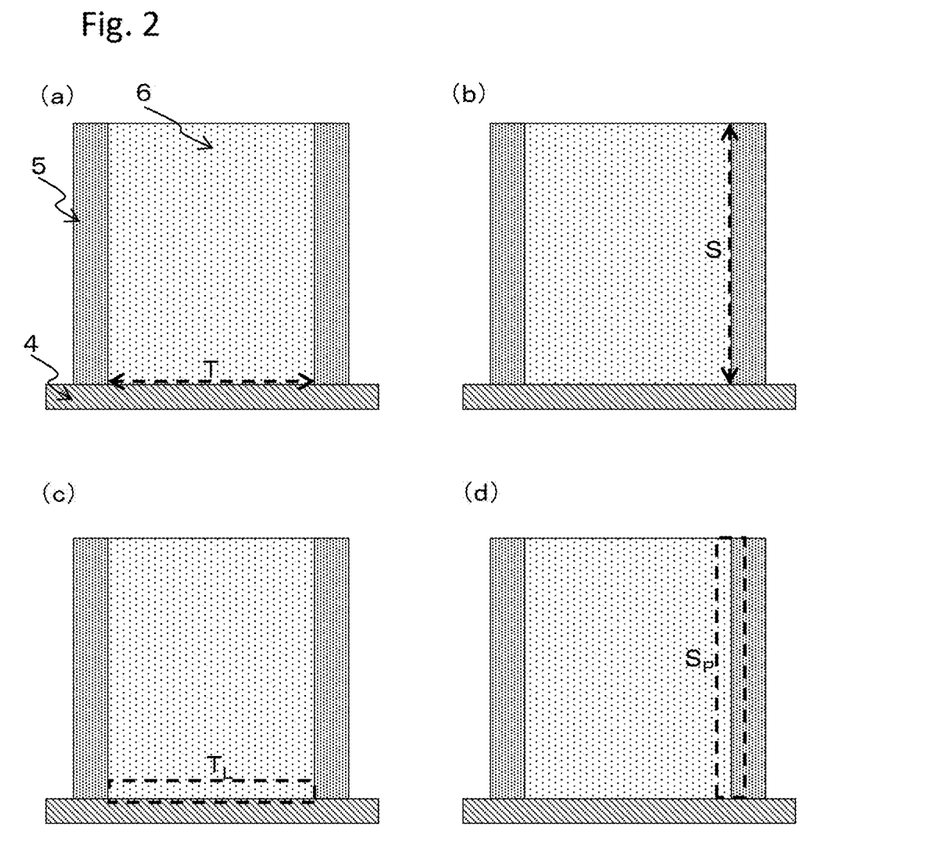
FIG. 2 is a sectional view showing one example of a conventional scintillator panel.

As shown in FIG. 2, in a conventional scintillator panel including barrier ribs having a shape with a high aspect ratio, the reflective layer surrounding the side S of the phosphor layer includes only the part $S_P$ where opposing surfaces of the reflective layer at the side S of the phosphor layer are approximately parallel, while the bottom T of the phosphor layer includes only the flat part $T_L$. Such a conventional scintillator panel does not include the part $S_C$ where the reflective layer surrounding the side S of the phosphor layer is curved and the part $T_C$ where the reflective layer at the bottom T of the phosphor layer is curved. Therefore, the emitted light did not efficiently travel to a detector due to reflection by a reflective layer on the barrier rib surface, thus resulting in insufficient brightness. In the present invention, as shown in FIGS. 3 and 4, by including the part where the reflective layer 12 surrounding the side of the phosphor layer is curved, the light emitted by the phosphor layer 6 easily travels to the surface of the phosphor layer 6 when reflected by the reflective layer 12, thus leading to an improvement in brightness. By also including the part $S_P$ where opposing surfaces of the reflective layer at the side of the phosphor layer are approximately parallel, the amount of the phosphor to be filled into the barrier ribs increases, leading to an improvement in brightness.

As used herein, "bottom" of the phosphor layer is a region from the nearest part between the phosphor layer and the substrate to the part $S_P$ where opposing surfaces of the reflective layer at the side of the phosphor layer are approximately parallel, and is the part where the phosphor layer is in contact with a member other than the phosphor layer. "Side" refers to the part where the phosphor layer is in contact with a member other than the phosphor layer, excluding the part $T_L$ where the bottom of the phosphor layer is flat. As mentioned above, $S_C$ and $T_C$ are the bottom and the side. "Approximately parallel" means nearly parallel, and even if perfectly parallel or slightly inclined or curved, it is included in the category of approximately parallel. Specifically, it means that an angle formed by two surfaces facing each other is 7° or less. "Curved surface" is a surface that has a continuous change, and means a part that has a curvature other than 0 in a sectional view. "Flat" refers to the part that does not have the aforementioned curved surface, and also includes a state where the surface has fine irregularity or the like. As used herein, "fine irregularity" means projections or depressions having a length of 1/100 or less of the thickness of the phosphor layer of the scintillator panel. For the sake of explanation, the reflective layer 12 and the phosphor 14 are omitted from FIGS. 2 to 4.

The ratio in a width direction of the part $T_C$ where the reflective layer at the bottom of the phosphor layer is curved to the part $T_L$ where the reflective layer is flat is 10.0:0 to 1.0:9.0. When the ratio is less than 1.0:9.0, if the light emitted at the bottom of the phosphor layer, especially near the edge of the bottom, is reflected by the reflective layer at the bottom, it becomes difficult for the light to travel to the surface of the phosphor layer 6, and thus the brightness tends to deteriorate. The ratio in a width direction of the part $T_C$ where the reflective layer at the bottom of the phosphor layer is curved to the part $T_L$ where the reflective layer is flat is preferably 10.0:0 to 3.0:7.0. Examples of the method for setting the above ratio at 10.0:0 to 1.0:9.0 include, but are not particularly limited to, a method in which, in the case of providing a barrier rib auxiliary layer, the concentration of a resin solution and the surface tension of the resin constituting the barrier rib auxiliary layer are adjusted in a barrier rib auxiliary layer formation step mentioned below. The present invention also include those in which the cell shape is rectangular and the part $T_C$ where the reflective layer at the bottom of the phosphor layer is curved to the part $T_L$ where the reflective layer is flat is within the above range.

The ratio in a thickness direction of the part $S_C$ where the reflective layer surrounding the side of the phosphor layer is curved to the part $S_P$ where opposing surfaces of the reflective layer at the side of the phosphor layer are approximately parallel is preferably 0.5:9.5 to 7.0:3.0. As used herein, "ratio in a thickness direction of the part $S_C$ where the reflective layer surrounding the side of the phosphor layer is curved to the part $S_P$ where opposing surfaces of the reflective layer at the side of the phosphor layer are approximately parallel" refers to a ratio of the length of the part corresponding to the curved part $S_C$ to the length of the part $S_P$ where opposing surfaces are approximately parallel in the projection obtained when the reflective layer is projected onto the plane forming the substrate surface. When the above ratio is 0.5:9.5 (the ratio of curved part is larger), the light emitted near the bottom of the phosphor layer 6 tends to travel to the surface of the phosphor layer when reflected by the reflective layer 12, thus enabling further improvement in brightness. Meanwhile, when the ratio is 7.0:3.0 (the ratio of parallel part is larger), the thickness of the phosphor layer increases in the vicinity of the barrier ribs, thus enabling further improvement in X-ray absorption rate. The ratio in a thickness direction of the part $S_C$ where the reflective layer surrounding the side of the phosphor layer is curved to the part $S_P$ where opposing surfaces of the reflective layer at the side of the phosphor layer are approximately parallel is more preferably 2.0:8.0 to 6.0:4.0. Examples of the method for setting the above ratio at 0.5:9.5 to 7.0:3.0 include, but are not particularly limited to, a method in which, in the case of providing a barrier rib auxiliary layer, the concentration of a resin solution and the surface tension of the resin constituting the barrier rib auxiliary layer are adjusted in a barrier rib auxiliary layer formation step mentioned below.

The shape and lengths in thickness and width directions of the reflective layer 12 are determined as follows: the cross-section of the barrier rib is exposed using an ion milling device (for example, EMTIC3X manufactured by LEICA) and images of the cross-section of the barrier rib are taken using a scanning electron microscope (for example, FE-SEM Merlin manufactured by Zeiss). The reflective layer 12 formed by a reflective layer formation step mentioned later tends to be thick near the top of the barrier rib and thin near the bottom of the barrier rib. When the thickness varies depending on the site, the thickness of the reflective layer 12 refers to the thickness of the central side surface in the height direction of the barrier rib.

(Protective Layer)

As the protective layer 13, both an inorganic protective layer and an organic protective layer can be suitably used. As the protective layer 13, an inorganic protective layer and an organic protective layer may be used in combination by being laminated.

The inorganic protective layer is suitable as a protective layer because of its low water vapor permeability. The inorganic protective layer can be formed by a known method such as a vacuum deposition method, a vacuum film forming method such as a sputtering method or a CVD method, a plating method, a paste coating method, or a spray injection method. The material of the inorganic protective layer is not particularly limited. Examples of the material for the inorganic protective layer include oxides such as silicon oxide, indium tin oxide and gallium zinc oxide, nitrides such as silicon nitride, and fluorides such as magnesium fluoride. Of these, silicon nitride is preferably used as the material for the inorganic protective layer because it has low water vapor permeability and the reflectivity of silver is less likely to decrease during the formation of the inorganic protective layer.

The thickness of the inorganic protective layer is not particularly limited. The thickness of the inorganic protective layer is, for example, preferably 2 nm or more, and more preferably 5 nm or more. The thickness of the inorganic protective layer is preferably 300 nm or less, and more preferably 100 nm or less. When the thickness is 2 nm or more, the scintillator panel can further enhance the effect of suppressing deterioration of the brightness in the usage environment. When the thickness is 300 nm or less, coloration due to the inorganic protective layer can be suppressed and the brightness can be further improved. The thickness of the inorganic protective layer can be measured by the same method as for the thickness of the organic protective layer, which will be mentioned later.

As the organic protective layer, a polymer compound having excellent chemical durability is preferable, and for example, it is preferable to contain polysiloxane or an amorphous fluororesin as a main component. As used herein, "amorphous fluororesin" refers to a case where peaks due to the crystal structure are not observed and only broad halo is observed when the fluorine-containing resin is measured by powder X-ray diffractometry. Moreover, "mainly composed" means that 50 to 100% by mass of the material constituting the organic protective layer is the polymer material.

The organic protective layer can be easily formed by known techniques such as solution coating and spray coating.

The thickness of the organic protective layer is preferably 0.05 μm or more, and more preferably 0.2 μm or more. The thickness of the organic protective layer is preferably 10 μm or less, and more preferably 5 μm or less. When the thickness of the organic protective layer is 0.05 μm or more, the scintillator panel 2 can further enhance the effect of suppressing deterioration of the brightness. When the thickness of the organic protective layer is 10 μm or less, the scintillator panel 2 can increase the volume in cells and fill the phosphors 14 in a sufficient amount, thus enabling further improvement in brightness. The thickness of the organic protective layer can be measured by scanning electron microscopy. The organic protective layer tends to be thin on the side near the top of the barrier rib and thick on the side near the bottom. Therefore, when there is a difference in thickness in this manner, the thickness of the organic protective layer refers to the thickness of the central side in the height direction of the barrier ribs.

(Phosphor Layer)

The scintillator panel of the present invention includes a phosphor layer 6 in cells divided by the barrier rib 5. The phosphor 14 contained in the phosphor layer may be any substance that emits light in a range from ultraviolet rays to infrared rays, mainly visible rays, when irradiated with radiation, and the phosphor may be either inorganic or organic phosphor.

Examples of the inorganic phosphor include sulfide-based phosphors, germanate-based phosphors, halide-based phosphors, barium sulfate-based phosphors, hafnium phosphate-based phosphors, tantalate-based phosphors, tungstate-based phosphors, rare earth silicate-based phosphors, rare earth oxysulfide-based phosphors, rare earth phosphate-based phosphors, rare earth oxyhalide-based phosphors, alkaline earth metal phosphate-based phosphors, alkaline earth metal fluorohalide-based phosphors and the like.

Examples of the rare earth silicate-based phosphor include cerium-activated rare earth silicate-based phosphors. Examples of the rare earth oxysulfide-based phosphor include praseodymium-activated rare earth oxysulfide-based phosphors, terbium-activated rare earth oxysulfide-based phosphors, and europium-activated rare earth oxysulfide-based phosphors. Examples of the rare earth phosphate-based phosphor include terbium-activated rare earth phosphate-based phosphors. Examples of the rare earth oxyhalide-based phosphor include terbium-activated rare earth oxyhalide-based phosphors and thulium-activated rare earth oxyhalide-based phosphors. Examples of the alkaline earth metal phosphate-based phosphor include europium-activated alkaline earth metal phosphate-based phosphors. Examples of the alkaline earth metal fluorohalide-based phosphor include europium-activated alkaline earth metal fluorohalide-based phosphors.

Examples of the organic phosphor include p-terphenyl, p-quaterphenyl, 2,5-diphenyloxazole, 2,5-diphenyl-1,3,4-oxodiazole, naphthalene, diphenylacetylene, stilbene and the like.

Two or more types thereof may be contained. Of these, phosphors selected from halide-based phosphors and rare earth oxysulfide-based phosphors are preferable, and of rare earth oxysulfides-based phosphors, gadolinium oxysulfide is more preferable from the viewpoint of the luminous efficiency and the chemical stability. The gadolinium oxysulfide is preferably terbium-activated, europium-activated or praseodymium-activated.

The phosphor 14 contained in the phosphor layer is preferably powdery. There is no particular limitation as long as it is powdery, and more specific examples thereof include particulate, columnar, scale-like, needle-like and the like. Of these, particulate phosphors are preferable. By making the shape of the phosphor 14 particulate, the phosphor is more uniformly dispersed in the phosphor layer, so that polarization in light emission of the phosphor in the phosphor layer is suppressed, thus enabling further improvement in brightness.

The average particle size of the phosphor 14 is preferably 0.5 to 50 μm, more preferably 3.0 to 40 μm, and still more preferably 4.0 to 30 μm. When the average particle size of the phosphor is 0.5 μm or more, the conversion efficiency from radiation to visible light is further improved, thus enabling further improvement in brightness. It is also possible to suppress aggregation of the phosphors. Meanwhile, when the average particle size of the phosphor is 50 μm or less, the phosphor layer has a surface excellent in smoothness, and the generation of bright spots in the image can be suppressed.

As used herein, the average particle size of the phosphor 14 in the present invention refers to a particle size that is 50% of the cumulative distribution of particle sizes, and can be measured by a particle size analyzer (e.g., MT3300; manufactured by Nikkiso Co., Ltd.). More specifically, the phosphor is charged in a sample chamber filled with water, and after performing an ultrasonic treatment for 300 seconds, the particle size distribution is measured, and the particle size that is 50% of the cumulative distribution is defined as the average particle size.

The decay time of the emission intensity of the scintillator panel is preferably 100 μs or less for the time required for an emission intensity to be 1/e times an initial emission intensity in the measurement method mentioned later. When the time required to be 1/e times is 100 μs or less, in an inspection method in which an object is continuously imaged using a radiation inspection device mentioned later, it becomes possible to suppress remaining the X-ray image of each object in the image of the subsequent object. As a result, high-speed continuous inspection becomes possible.

The decay time of the emission intensity can be measured by a known method. Specifically, it is possible to exemplify a method using ultraviolet light as excitation light and using a fluorescence lifetime measuring device (for example, Quantaurus-Tau C11367-24; Hamamatsu Photonics K.K.), a method using a device composed of an optical fiber, a photodiode, and a photosensor amplifier and using radiation as an excitation source, and the like. As a method for shortening the decay time of the emission intensity, taking an example of using gadolinium oxysulfide as the phosphor, there is a method of using an activator of the phosphor other than terbium. Particularly, it is preferable that the decay time is shortened by activation of the phosphor with praseodymium.

(Binder Resin)

The material of the binder resin 15 is not particularly limited. For example, it is possible to use, as the binder resin 15, thermoplastic resins, thermosetting resins, photocurable resins and the like. More specifically, the binder resin 15 preferably includes acrylic resins, cellulose resins, epoxy resins, melamine resins, phenol resins, urea resins, vinyl chloride resins, butyral resins, polyvinyl acetal, silicone resins, polyester resins, polyamide resins, polyimide resins, polyetherimide resins, polyamideimide resins, polyketone resins, polyether resins, polyether ether ketone resins, polyethylene, polypropylene, polycarbonate, polystyrene, polyvinyltoluene, polyvinylpyrrolidone, polyacrylamide, polyvinyl acetate, aromatic hydrocarbon resins, polyalkylenepolyamine resins, polybenzimidazole resins, polypyrrole resins, polythiophene resins and the like. Two more thereof may be contained.

Of these, the binder resin 15 preferably contains at least one selected from polyester resins, polyamide resins, polyimide resins, polyamideimide resins and polyether resins. As used herein, the polyether-based resin is a resin having an ether bond in its main chain, and specific examples thereof include polyether resins, polyether ether ketone resins, polyetherimide resins and the like. As a result, light decay in the cells of the scintillator panel 2 can be suppressed, and it is easy to sufficiently extract the emitted light. The binder resin 15 preferably contains one to three types of the above resins as main components. This makes it easier to obtain the above-mentioned effect of suppressing light decay in the cells. It is noted that the main component means that the total amount of the specific resin is 50 to 100% by mass of the material constituting the binder resin 15.

The resin used as the material of the binder resin 15 preferably has an aromatic hydrocarbon group as a repeating unit in a main chain structure. When the binder resin 15 has an aromatic hydrocarbon group as a repeating unit in the structure of the main chain, the binder resin is less likely to be colored due to irradiation with radiation during use of the scintillator panel, leading to further improvement in brightness. Specific examples of the aromatic hydrocarbon group include a phenylene group, naphthylene group, an anthracenylene group, a phenanthrenylene group and the like. Two or more types thereof may be included. Of these, a phenylene group or a naphthylene group is preferable, and a phenylene group is particularly preferable, from the viewpoint of the solvent solubility, transparency and color of the resin.

The structure of the binder resin can be confirmed by a method of attributing detected peaks using a nuclear magnetic resonance device (NMR).

(Radiation Detector)

The radiation detector of the present invention comprises the scintillator panel on an output substrate including a photoelectric conversion layer. The output substrate includes a photoelectric conversion layer and an output layer on the substrate. As the photoelectric conversion layer, a layer including pixels having a photosensor formed therein is generally used.

(Radiation Inspection Device)

The radiation inspection device of the present invention includes a radiation generating part that generates radiation, and the above-mentioned radiation detector. The radiation inspection device is an device in which a subject is irradiated with radiation from the radiation generating part and the radiation passed through the subject is detected by a radiation detector. By mounting the radiation detector of the present invention in a radiation detecting part, a radiation inspection device with high brightness can be obtained.

(Method for Producing Scintillator Panel)

The method for producing a scintillator panel according the embodiment of the present invention comprises a barrier rib formation step of forming a barrier rib on a substrate to divide into cells, a barrier rib auxiliary layer formation step of forming a barrier rib auxiliary layer on a surface of the barrier rib, a reflective layer formation step of forming a reflective layer on surfaces of the barrier rib and the barrier rib auxiliary layer, and a phosphor filling step of filling a phosphor into the cells divided by the barrier rib. Each step will be described below. Hereinafter, the same components as those described in the above embodiment of the scintillator panel will be omitted as appropriate.

(Barrier Rib Formation Step)

The barrier rib formation step is a step of forming a barrier rib on a substrate to divide into cells. More specifically, it is a step of forming a barrier rib having a grid-like shape on a substrate to form spaces (cells) divided by the barrier rib. Various known methods can be used as the method for forming the barrier rib on the substrate, and the method is not particularly limited. A photolithographic method is preferable as the method for forming the barrier rib, because of easily controlling the shape.

As an example, when forming a barrier rib containing the compound (P) using a photolithographic method, the barrier rib can be formed by a coating step of coating a photosensitive resin composition containing the compound (P) on a surface of a substrate to obtain a coating film, and a pattern formation step of exposing and developing the coating film to obtain a barrier rib pattern. As used herein, "photosensitive resin composition" means a resin composition containing a photocationic polymerization initiator and a cationically polymerizable compound, and may further contain, in addition to the above components, additives such as surfactants, solvents, polymers, and the like.

The coating step is a step of entirely or partially coating the above photosensitive resin composition on a surface of a substrate to obtain a coating film. Examples of the method for coating the photosensitive resin composition include screen printing, bar coater, roll coater, die coater, or blade coater. The thickness of the coating film thus obtained can be adjusted by the number of coating, the mesh size of the screen, or the viscosity of the paste.

Next, the photosensitive resin composition coating film formed by the above method is exposed to actinic rays through a mask having a desired pattern. Actinic rays used for exposure include ultraviolet rays, visible rays, electron beams, X-rays and the like. In the present invention, it is preferable to use i-rays (365 nm), h-rays (405 nm) and g-rays (436 nm) of a mercury lamp.

In order to form a pattern, the unexposed area is removed with a developing solution after exposure. The developing solution is preferably an aqueous solution of tetramethylammonium hydroxide, or an aqueous solution of compounds showing alkalinity, such as diethanolamine, diethylaminoethanol, sodium hydroxide, potassium hydroxide, sodium carbonate, potassium carbonate, triethylamine, diethylamine, methylamine, dimethylamine, dimethylaminoethyl acetate, dimethylaminoethanol, dimethylaminoethyl methacrylate, cyclohexylamine, ethylenediamine, and hexamethylenediamine. In some cases, these aqueous alkaline solutions may contain polar solvents such as N-methyl-2-pyrrolidone, N,N-dimethylformamide, N,N-dimethylacetamide, dimethyl sulfoxide, γ-butyrolactone and dimethylacrylamide; alcohols such as methanol, ethanol and isopropanol; esters such as ethyl lactate and propylene glycol monomethyl ether acetate; ketones such as cyclopentanone, cyclohexanone, isobutyl ketone and methyl isobutyl ketone alone or in combination of several types thereof.

Development can be carried out by a method such as spraying the developing solution onto the coating film surface, heaping the developing solution onto the coating film surface, immersing in the developing solution, or immersing and applying ultrasonic waves. Developing conditions such as the developing time and the temperature of the developing solution in the developing step may be any conditions as long as a pattern can be formed by removing the exposed area.

After development, a rinsing treatment with water is preferably carried out. The rinsing treatment may be carried out using water containing alcohols such as ethanol and isopropyl alcohol; and esters such as ethyl lactate and propylene glycol monomethyl ether acetate added thereto.

The coating film may be subjected to a baking treatment before development as necessary. This may improve the resolution of the pattern after development and increase the acceptable range of development conditions. The baking temperature is preferably in a range of 50 to 180° C., and more preferably 60 to 120° C. The time is preferably 5 seconds to several hours.

After formation of the pattern, an unreacted cationic polymerizable compound and a photocationic polymerization initiator remain in the coating film of the photosensitive resin composition. For this reason, these may be thermally decomposed to generate gas during a thermal crosslinking reaction mentioned later. In order to avoid this, it is preferable to irradiate the entire surface of the resin composition coating film after formation of the pattern with the above-mentioned exposure light to generate an acid from the photocationic polymerization initiator. By doing so, the reaction of the unreacted cationic polymerizable compound proceeds during the thermal crosslinking reaction, thus enabling suppression of the generation of gas due to thermal decomposition.

After development, the thermal crosslinking reaction is preferably allowed to proceed at a temperature of 120° C. to 300° C. Crosslinking can improve the heat resistance and the chemical resistance of the resulting barrier ribs. It is possible to select, as the heat treatment method, a method of selecting the temperature and raising the temperature stepwise, or a method of selecting a certain temperature range and continuously raising the temperature for 5 minutes to 5 hours.

A base material used during formation of a barrier rib may be used as the substrate of the scintillator panel, or the barrier rib may be peeled from the base material and then the peeled barrier rib may be placed on the substrate. The method for peeling the barrier rib from the base material may be a known method, such as a method for providing a peeling auxiliary layer between the base material and the barrier rib.

(Barrier Rib Auxiliary Layer Formation Step)

The method for producing a scintillator panel according to the embodiment of the present invention includes a barrier rib auxiliary layer formation step of forming a barrier rib auxiliary layer on a surface of the barrier rib. The barrier rib auxiliary layer may be formed on at least part of the barrier rib surface. The barrier rib auxiliary layer is preferably in contact with at least part of the barrier rib and the substrate. The method for forming a barrier rib auxiliary layer is not particularly limited. For example, the barrier rib auxiliary layer is formed by coating a resin solution under vacuum in cells divided by the barrier rib of the substrate on which the barrier rib is formed as mentioned above (hereinafter referred to as barrier rib substrate), and drying to remove the solvent.

(Reflective Layer Formation Step)

The method for producing a scintillator panel according to the embodiment of the present invention includes a reflective layer formation step of forming a reflective layer on surface(s) of the barrier rib and/or the barrier rib auxiliary layer.

The method for forming a reflective layer is not particularly limited. For example, the reflective layer can be formed by a vacuum deposition method, a vacuum film forming method such as a sputtering method or a CVD method, a plating method, a paste coating method, or an injection method using a spray. Of these, the reflective layer formed by the sputtering method is preferable because of having higher uniformity of the reflectivity and higher corrosion resistance than those of the reflective layer formed by other methods.

(Protective Layer Formation Step)
(Inorganic Protective Layer Formation Step)

The method for producing a scintillator panel according to the preferred embodiment may include an inorganic protective layer formation step of forming an inorganic protective layer on a surface of the reflective layer. The method for forming an inorganic protective layer is not particularly limited. For example, the inorganic protective layer can be formed by a vacuum deposition method, a vacuum film forming method such as a sputtering method or a CVD method, a paste coating method, or an injection method using a spray. Of these, the inorganic protective layer formed by the sputtering method is preferable because of having higher uniformity and higher corrosion resistance than those of the inorganic protective layer formed by other methods.

(Organic Protective Layer Formation Step)

The method for producing a scintillator panel according to the preferred embodiment may include an organic protective layer formation step of forming an organic protective layer on a surface of the reflective layer. The method for forming an organic protective layer is not particularly limited. For example, the organic protective layer can be formed by coating a solution of polysiloxane or an amorphous fluorine-containing resin on the barrier rib substrate under vacuum, and drying to remove the solvent.

When using the polysiloxane, the dried substrate is preferably cured at a temperature higher than the drying temperature. Curing promotes condensation of polysiloxane to improve the heat resistance and the chemical resistance, thus making it easier to improve the initial brightness of the scintillator panel.

When using the amorphous fluororesin, because of high moisture permeability and high chemical resistance, the initial brightness of the scintillator panel is likely to be improved.

(Phosphor Filling Step)

The method for producing a scintillator panel according to the embodiment of the present invention includes a phosphor filling step of filling a phosphor into the cells divided by the barrier rib. The filling method of the phosphor is not particularly limited. For example, since the process is simple and it is possible to uniformly fill a phosphor into a large area, the phosphor filling method is preferably a method of coating a phosphor paste, which is obtained by mixing a phosphor powder and a binder resin in a solvent, on a barrier rib substrate under vacuum, and drying to remove the solvent.

As mentioned above, according to the method for producing a scintillator panel according to the embodiment of the present invention, the resulting scintillator is capable of obtaining images with high brightness.

EXAMPLES

The present invention will be described in more detail below by way of Examples and Comparative examples, but the present invention is not limited thereto. The compounds used in Examples and Comparative Examples were synthesized by the following methods.

(Raw Materials of Polyimide A)
- Amine compound: 2,2-bis(3-amino-4-hydroxyphenyl) hexafluoropropane (hereinafter referred to as BAHF, manufactured by Tokyo Chemical Industry Co., Ltd.)
- Acid anhydride: RIKACID (trademark registration) TDA-100 (manufactured by New Japan Chemical Co., Ltd.)
- Solvent: γ-butyrolactone (hereinafter referred to as GBL, manufactured by FUJIFILM Wako Pure Chemical Corporation).

(Synthesis of Polyimide A)

Under a dry nitrogen stream, 29.30 g (0.08 mol) of BAHF was added to 80 g of GBL, and then dissolved while stirring at 120° C. Next, 30.03 g (0.1 mol) of TDA-100 was added together with 20 g of GBL, followed by stirring at 120° C. for 1 hour and further stirring at 200° C. for 4 hours to obtain a reaction solution. Next, the reaction solution was poured into 3 L of water to obtain a white precipitate. This precipitate was collected by filtration, washed three times with water, and then dried in a vacuum dryer at 80° C. for 5 hours to obtain a polyimide A.

(Raw Materials of Photosensitive Polyimide Varnish)
- Epoxy compound: "TEPIC®"-VL (manufactured by Nissan Chemical Corporation)
- Photoacid generator "CPI®"-310B (manufactured by San-Apro Ltd.)
- Silane coupling agent: KBM-403 (manufactured by Shin-Etsu Chemical Co., Ltd.).

(Raw Materials of Barrier Rib Auxiliary Layer)

Raw materials used for preparing a resin solution for a barrier rib auxiliary layer are as follows.
- Solvent A: ethyl acetoacetate (manufactured by Daiwa Kayaku Co., Ltd.)
- Solvent B: decane (manufactured by FUJIFILM Wako Pure Chemical Corporation)
- Solvent C: GBL
- Siloxane resin A: obtained by adding 0.5 part by mass of phosphoric acid to 100 parts by mass of polysiloxane A mentioned later
- Siloxane resin B: TSE-3450 (obtained by mixing a dimethylsiloxane oligomer with a curing agent at a mass fraction of 10:1, manufactured by MOMENTIVE Inc.)
- Siloxane resin C: obtained by adding 2 parts by mass of tetrabutyl orthotitanate to 100 parts by mass of X-40-9250 (manufactured by Shin-Etsu Chemical Co., Ltd.)
- Epoxy resin A: LE-1421 (obtained by mixing an epoxy compound with an acid anhydride at a mass fraction of 10:7, manufactured by Sanyu Rec Co., Ltd.)
- Polyimide resin A: prepared in Examples mentioned later (Preparation of Resin Solution for Barrier Rib Auxiliary Layer)

Each resin and solvent were mixed so as to have the concentrations shown in Tables 1 to 3, and charged in a stirring vessel, followed by stirring at room temperature for 30 minutes to obtain each resin solution.

(Raw Materials of Polysiloxane A)

Organosilanes used in the synthesis of a polysiloxane A are as follows.
- Organosilane S-1: methyltrimethoxysilane
- Organosilane S-2: phenyltrimethoxysilane
- Organosilane S-3: 2-(3,4-epoxycyclohexyl)ethyltrimethoxysilane.

(Synthesis of Polysiloxane A)

In a 500 ml three-necked flask, 16.34 g (0.12 mol) of organosilane S-1, 29.75 g (0.15 mol) of organosilane S-2, 7.39 g (0.03 mol) of organosilane S-3, and 45.00 g of propylene glycol monomethyl ether acetate (PGMEA) were charged, and an aqueous phosphoric acid solution obtained by dissolving 0716 g of phosphoric acid in 16.21 g of water (0.30% by mass relative to the monomer charged) was added over 30 minutes while stirring at room temperature. The flask was placed in an oil bath at 70° C., and after stirring for 90 minutes, the oil bath was heated to 115° C. for 30 minutes. One hour after the start of heating, the temperature of the solution reached 100° C., followed heating with stirring for 2 hours (the solution temperature was 100 to 110° C.) to obtain a polysiloxane solution. During temperature rising and heating with stirring, nitrogen was allowed to flow at a flow rate of 0.05 liter/min. To the polysiloxane solution thus obtained, PGMEA was added so as to have 40% by weight of the solid component concentration to obtain a polysiloxane A solution. As a result of the measurement of the polysiloxane A solution thus obtained, the mol percentages of the repeating units derived from organosilanes S-1, S-2, and S-3 measured by $^{29}$Si-NMR were 40 mol %, 50 mol %, and 10 mol %, respectively.

(Evaluation of Reflective Layer Shape)

For each scintillator panel after filling a phosphor layer, the cross-section of a barrier rib was exposed using a triple ion milling device EM TIC 3X (manufactured by LEICA) and images of the reflective layer formation part of the cross-section of the barrier rib were taken using a field emission scanning electron microscope (FE-SEM) Merlin (manufactured by Zeiss). From the images thus taken, the length of the part where the reflective layer is curved and the length of the part where opposing surfaces of the reflective layer are approximately parallel on the side of the barrier rib were measured, and the ratio thereof was calculated. Similarly, the reflective layer at the bottom of the phosphor layer was observed, and the length of the part where the reflective layer is curved and the length of the part where the reflective layer is flat in the width direction were measured, and the ratio thereof was calculated. Regarding the length of the part where opposing surfaces of the reflective layer are approximately parallel on the side of the barrier rib, an approximate line corresponding to 10 μm on each of the opposing reflective layer surfaces in a single cell was drawn, and the part where the angle between the approximate lines is 7° or less is defined as a substantially parallel portion.

(Evaluation of Brightness)

Each scintillator panel after filling a phosphor layer was aligned and disposed in the center of the photosensor surface of an X-ray detector PaxScan 2520V (manufactured by Varian) so that the cells of the scintillator panel corresponded one-to-one with pixels of the photosensor, and the ends of the substrates were fixed with an adhesive tape to fabricate a radiation detector. This detector was irradiated with X-rays from an X-ray irradiation device L9181-02 (manufactured by Hamamatsu Photonics K.K.) under conditions of a tube voltage of 50 kV and a distance between the X-ray tube and the detector of 30 cm to obtain an image. In the image thus obtained, the average value of the digital values of 256×256 pixels at the center of the light emitting position of the scintillator panel is defined as the brightness value, and relative comparisons were made for each sample, with the brightness of Comparative Example 1 as 100% for Examples 1 to 14 and Comparative Examples 2 to 4, and the brightness of Comparative Example 5 as 100% for Examples 15 to 22 and Comparative Examples 6 to 8.

(Evaluation of X-Ray Absorption Rate)

Each scintillator panel after filling a phosphor layer was disposed on the detection part of an EMF123-type X-ray spectrometer (manufactured by EMF Japan Co., Ltd.). When this scintillator panel was irradiated with X-rays from an X-ray radiation device L9181-02 (manufactured by Hamamatsu Photonics K.K.) under the conditions of a tube voltage of 50 kV and a distance between the X-ray tube and the detector of 30 cm, a photon number spectrum was obtained. The total number of photons of the obtained spectrum was defined as the X-ray transmission amount, and the X-ray absorption rate of the scintillator panel was calculated from the difference from the total number of photons when X-rays were irradiated without the scintillator panel. For Examples 1 to 14 and Comparative Examples 2 to 4, the relative value was calculated when the value of Comparative Example 1 was 100, and for Examples 15 to 22 and Comparative Examples 6 to 8, the relative value was calculated when the value of Comparative Example 5 was 100. The case where the relative value is 95 or more was rated as A, the case where the relative value is 90 or more and less than 95 was as B, and the case where the relative value is less than 90 was rated as C, respectively.

(Evaluation of Decay Time of Emission Intensity)

For the scintillator panels fabricated in Examples and Comparative Examples, the emission intensity at the wavelength of maximum emission intensity when excited with light at the excitation wavelength of 297 nm (hereinafter referred to as the maximum emission wavelength) was measured using Fluorolog 3C-2iHR320 (manufactured by HORIBA Jobin Yvon GmbH). The light source was then turned off and the time change of the emission intensity from the time when the light source was turned off was measured. The time required for the emission intensity to be 1/e with respect to the emission intensity at the time when the light source was turned off was obtained.

Example 1

(Fabrication of Barrier Rib Substrate)
(Preparation of Photosensitive Polyimide Varnish)

10 g of a polyimide A, 10 g of "TEPIC"-VL, 0.6 g of "CPI"-310B and 0.8 g of KBM-403 were dissolved in GBL. The amount of the solvent (GBL) added was adjusted so that the solid component concentration was 60% by mass when the additive other than the solvent was defined as the solid component. The resulting solution was subjected to pressure filtration using a filter having a hold particle size of 1 μm to obtain a photosensitive polyimide varnish A. Hereinafter, the polyimide resin A corresponds to the solid component of the [Photosensitive Polyimide Varnish A] is defined as a polyimide resin A.

(Fabrication of Polyimide Barrier Rib)

A PI (polyimide) film in size of 125 mm×125 mm×0.25 mm was used as the substrate. The photosensitive polyimide varnish A was coated on a surface of the substrate using a die coater so that the thickness after drying was 150 μm, and then dried to obtain a polyimide resin A coating film. The coating film of the polyimide resin A was then exposed at an exposure dose of 2,000 mJ/cm$^2$ through a photomask having openings corresponding to the desired pattern (a chromium mask having grid-like openings with a pitch of 127 μm and a line width of 10 μm) using an ultra-high pressure mercury lamp. The exposed coating film was developed in an aqueous 2% by mass potassium hydroxide solution to remove the unexposed area to obtain a grid-like pattern. The grid-like pattern thus obtained was thermally crosslinked and cured at 150° C. for 60 minutes in the air to obtain a barrier rib substrate including grid-like barrier ribs formed on the substrate.

(Formation of Barrier Rib Auxiliary Layer)

A siloxane resin A was dissolved in a solvent A so that the solid content was 30% by weight. The resin solution thus obtained was vacuum-printed in the cells divided by the barrier rib of the barrier rib substrate, dried at 90° C. for 1 hour, and further cured at 190° C. for 1 hour to form a barrier rib auxiliary layer in the cells as shown in FIG. 3.

(Formation of Reflective Layer and Inorganic Protective Layer)

A reflective layer was formed on the barrier rib substrate on which the barrier rib auxiliary layer was formed, using a commercially available sputtering device and a sputtering target. At the time of sputtering, a flat glass plate was disposed in the vicinity of the barrier rib substrate, and sputtering was carried out under the condition that the thickness of the metal on the flat glass plate was 300 nm. APC (manufactured by FURUYA METAL Co., Ltd.), which is a silver alloy containing palladium and copper, was used as a sputtering target for forming a reflective layer. After forming the reflective layer, SiN was formed as a protective layer in the same vacuum batch so as to have a thickness of 100 nm on the glass substrate.

(Formation of Organic Protective Layer)
Fluorine-Containing Resin Solution

1 Part by mass of "CYTOP®" CTL-809M as the amorphous fluorine-containing resin was mixed with 1 part by mass of a fluorine-based solvent CT-SOLV180 (manufactured by AGC Inc.) as the solvent to prepare a resin solution.

This resin solution was vacuum-printed on the barrier rib substrate on which the reflective layer and the inorganic protective layer were formed, dried at 90° C. for 1 hour, and further cured at 190° C. for 1 hour to form an organic protective layer. After the formation of the organic protective layer on the barrier rib substrate, the cross-section of the barrier rib was exposed using a triple ion milling device EMTIC3X (manufactured by LEICA), and images of the reflective layer formation part of the cross-section of the barrier rib were taken using a field emission scanning electron microscope (FE-SEM) Merlin (manufactured by Zeiss). The thickness of the organic protective layer on the side of the center of the barrier rib in the height direction of the barrier rib substrate measured from the images thus taken was 1 µm.

(Phosphor)

The phosphors used in the phosphor layer are as follows.
  Phosphor powder 1: $Gd_2O_2S$:Tb (manufactured by NICHIA CORPORATION, average particle size of 11 µm)
  Phosphor powder 2: $Gd_2O_2S$:Pr (manufactured by NICHIA CORPORATION, average particle size of 5 µm)

(Binder Resin of Phosphor Layer)

The materials used for the binder resin for the phosphor layer are as follows.
  Binder resin A: "ETHOCEL®" 7cp (cellulose-based resin, manufactured by The Dow Chemical Company)
  Binder resin B: "VYLON®" 270 (polyester resin, manufactured by TOYOBO CO., LTD.)
  Binder resin C: "Grilamid®" TR55 (polyamide resin, manufactured by EMS-CHEMIE AG)
  Binder resin D: "VYLOMAX®" HR-15ET (polyamide-imide resin, manufactured by TOYOBO CO., LTD.)
  Solvent: benzyl alcohol (manufactured by FUJIFILM Wako Pure Chemical Corporation)

The binder resin shown in Table 1 was dissolved in the above solvent to obtain a binder resin solution.

(Formation of Phosphor Layer)

10 Parts by mass of a phosphor powder 1 was mixed with 5 parts by mass of the binder resin A solution having a concentration of 10% by mass to prepare a phosphor paste. This phosphor paste was vacuum-printed in the cells divided by the barrier rib of the barrier rib substrate on which the reflective layer, the inorganic protective layer and the organic protective layer were formed as mentioned above to fill so that the volume fraction of the phosphor in the cells was 65%, followed by drying at 150° C. for 15 minutes to form a phosphor layer.

Examples 2 to 9

The same procedure as in Example 1 was used, except that the resin solution for a barrier rib auxiliary layer was changed as mentioned in Table 1 or Table 2 in Example 1, (formation of a barrier rib auxiliary layer) to (formation of a phosphor layer) were carried out.

Examples 10 to 12

The same procedure as in Example 2 was used, except that the binder resin of the phosphor layer was changed to resins mentioned in Table 2 in Example 2, (formation of a barrier rib auxiliary layer) to (formation of a phosphor layer) were carried out.

Example 13

(Fabrication of Barrier Rib Substrate)
(Raw Materials of Glass Powder-Containing Paste)
  Photosensitive monomer M-1: trimethylolpropane triacrylate
  Photosensitive monomer M-2: tetrapropylene glycol dimethacrylate
  Photosensitive polymer: obtained by addition reaction of 0.4 equivalent of glycidyl methacrylate with carboxyl groups of a copolymer consisting of methacrylic acid/methyl methacrylate/styrene=40/40/30 (weight-average molecular weight of 43,000; acid value of 100)
  Photopolymerization initiator: 2-benzyl-2-dimethyl-amino-1-(4-morpholinophenyl)butanone-1 (manufactured by BASF Corporation)
  Polymerization inhibitor: 1,6-hexanediol-bis[(3,5-di-t-butyl-4-hydroxyphenyl)propionate])
  Ultraviolet absorber solution: γ-butyrolactone 0.3% by mass solution of Sudan IV (manufactured by Tokyo Ohka Kogyo Co., Ltd.)
  Viscosity modifier: Fluonon EC121 (manufactured by KYOEISHA CHEMICAL Co., LTD.)
  Solvent: γ-butyrolactone (manufactured by FUJIFILM Wako Pure Chemical Corporation)
  Low softening point glass powder: $SiO_2$: 27% by mass, $B_2O_3$: 31% by mass, ZnO: 6% by mass, $Li_2O$: 7% by mass, MgO: 2% by mass, CaO: 2% by mass, BaO: 2% by mass, $Al_2O_3$: 23% by mass, refractive index (ng) of 1.56, glass softening temperature of 588° C., thermal expansion coefficient of $70 \times 10^{-7}$ ($K^{-1}$), average particle size of 2.3 µm (Preparation of Glass Powder-Containing Paste)

4 Parts by mass of a photosensitive monomer M-1, 6 parts by mass of a photosensitive monomer M-2, 24 parts by mass of a photosensitive polymer, 6 parts by mass of a photopolymerization initiator, 0.2 part by mass of a polymerization inhibitor and 12.8 parts by mass of an ultraviolet absorber solution were heated and dissolved in 38 parts by mass of a solvent of at a temperature of 80° C. After cooling the solution thus obtained, 9 parts by mass of a viscosity modifier was added to obtain an organic solution 1. The refractive index (ng) of the organic coating film obtained by coating the resulting organic solution 1 on a glass plate and drying was 1.555. After adding 50 parts by mass of low softening point glass powder to 50 parts by mass of organic solution 1, the mixture was kneaded with a three-roller kneader to obtain a glass powder-containing paste P.

(Fabrication of Glass Barrier Rib Substrate)

A soda glass plate in size of 125 mm×125 mm×0.7 mm was used as the substrate. The glass powder-containing paste P was coated on a surface of the substrate using a die coater so that the thickness after drying was 150 µm, and then dried to obtain a coating film of the glass powder-containing paste. The coating film of the glass powder-containing paste was then exposed at an exposure dose of 300 mJ/cm² through a photomask having openings corresponding to the desired pattern (a chromium mask having grid-like openings with a pitch of 127 µm and a line width of 10 µm) using an ultra-high pressure mercury lamp. The exposed coating film was developed in an aqueous 0.5% by mass ethanolamine solution to remove the unexposed area to obtain a grid-like pre-firing pattern. The grid-like pre-firing pattern thus obtained was thermally crosslinked and cured at 580° C. for 15 minutes in the air to obtain a barrier rib substrate having grid-like barrier ribs containing glass as a main component formed on the substrate.

The same procedure as in Example 1 was used, except that the barrier rib substrate thus obtained was used and the resin solution for a barrier rib auxiliary layer was changed as mentioned in Table 2, (formation of a barrier rib auxiliary layer) to (formation of a phosphor layer) were carried out.

Example 14

The same procedure as in Example 13 was used, except that the solid content of the resin solution of the barrier rib auxiliary layer was changed to 35% by weight in Example 13, (formation of a barrier rib auxiliary layer) to (formation of a phosphor layer) were carried out.

Comparative Example 1

The same procedure as in Example 1 was used, except that the barrier rib auxiliary layer was not formed in Example 1, (formation of a reflective layer and an inorganic protective layer) to (formation of a phosphor layer) were carried out.

Comparative Example 2

The same procedure as in Example 1 was used, except that the solid content of the resin solution of the barrier rib auxiliary layer was changed to 1% by weight in Example 1, (formation of a barrier rib auxiliary layer) to (formation of a phosphor layer) were carried out.

Comparative Example 3

The same procedure as in Example 13 was used, except that the exposure dose of a ultrahigh pressure mercury lamp n the fabrication of the barrier rib was set at 1,000 mJ/cm² and the barrier rib auxiliary layer was not formed in Example 13, (formation of a reflective layer and an inorganic protective layer) to (formation of a phosphor layer) were carried out.

Comparative Example 4

The same procedure as in Example 13 was used, except that the barrier rib auxiliary layer was not formed in Example 13, (formation of a reflective layer and an inorganic protective layer) to (formation of a phosphor layer) were carried out.

Example 15

The same procedure as in Example 2 was used, except that the phosphor was changed to those mentioned in Table 4 in Example 2, (formation of a barrier rib auxiliary layer) to (formation of a phosphor layer) were carried out.

Examples 16 to 18

The same procedure as in Example 15 was used, except that the resin solution for a barrier rib auxiliary layer was changed as mentioned in Table 4 in Example 15, (formation of a barrier rib auxiliary layer) to (formation of a phosphor layer) were carried out.

Examples 19 to 21

The same procedure as in Example 15 was used, except that the binder resin of the phosphor layer was changed in resins mentioned in Table 4 in Example 15, (formation of a barrier rib auxiliary layer) to (formation of a phosphor layer) were carried out.

Example 22

The same procedure as in Example 14 was used, except that the phosphor was changed in those mentioned in Table 4 in Example 14, (formation of a barrier rib auxiliary layer) to (formation of a phosphor layer) were carried out.

Comparative Example 5

The same procedure as in Comparative Example 1 was used, except that the phosphor was changed to those mentioned in Table 5 in Comparative Example 1, (formation of a reflective layer and an inorganic protective layer) to (formation of a phosphor layer) were carried out.

Comparative Example 6

The same procedure as in Comparative Example 2 was used, except that the phosphor was changed to those mentioned in Table 5 in Comparative Example 2, (formation of a reflective layer and an inorganic protective layer) to (formation of a phosphor layer) were carried out.

Comparative Example 7

The same procedure as in Comparative Example 3 was used, except that the phosphor was changed to those mentioned in Table 5 in Comparative Example 3, (formation of a reflective layer and an inorganic protective layer) to (formation of a phosphor layer) were carried out.

Comparative Example 8

The same procedure as in Comparative Example 4 was used, except that the phosphor was changed to those mentioned in Table 5 in Comparative Example 4, (formation of a reflective layer and an inorganic protective layer) to (formation of a phosphor layer) were carried out.

TABLE 1

|  | Example 1 | Example 2 | Example 3 | Example 4 | Example 5 | Example 6 | Example 7 |
|---|---|---|---|---|---|---|---|
| Substrate | Polyimide film | Polyimide film | Polyimide film | Polyimide film | Polyimide film | Polyimide film | Polyimide film |
| Barrier rib | Polyimide | Polyimide | Polyimide | Polyimide | Polyimide | Polyimide | Polyimide |
| Barrier rib auxiliary layer (resin) | Siloxane resin A | Siloxane resin A | Siloxane resin A | Siloxane resin A | Siloxane resin A | Siloxane resin B | Siloxane resin C |
| Barrier rib auxiliary layer (solvent) | Solvent A | Solvent A | Solvent A | Solvent A | Solvent A | Solvent B | Solvent B |
| Solution concentration (% by weight) | 30 | 25 | 15 | 8 | 40 | 25 | 25 |
| Sc:SP | 6.5:3.5 | 5.0:5.0 | 4.0:6.0 | 2.0:8.0 | 7.5:2.5 | 4.0:6.0 | 4.5:5.5 |
| Tc:TL | 10.0:0 | 10.0:0 | 8.0:2.0 | 5.0:5.0 | 3.0:7.0 | 8.0:2.0 | 10.0:0 |
| Phosphor | GOS:Tb Particulate | GOS:Tb Particulate | GOS:Tb Particulate | GOS:Tb Particulate | GOS:Tb Particulate | GOS:Tb Particulate | GOS:Tb Particulate |
| Binder resin | Binder resin A | Binder resin A | Binder resin A | Binder resin A | Binder resin A | Binder resin A | Binder resin A |

TABLE 1-continued

|  | Example 1 | Example 2 | Example 3 | Example 4 | Example 5 | Example 6 | Example 7 |
|---|---|---|---|---|---|---|---|
| Time required for emission intensity to be 1/e (μs) | 650 | 650 | 650 | 650 | 650 | 650 | 650 |
| Brightness | 130 | 135 | 120 | 110 | 115 | 115 | 125 |
| X-ray absorption rate | B | A | A | A | C | A | A |

TABLE 2

|  | Example 8 | Example 9 | Example 10 | Example 11 | Example 12 | Example 13 | Example 14 |
|---|---|---|---|---|---|---|---|
| Substrate | Polyimide film | Polyimide film | Polyimide film | Polyimide film | Polyimide film | Glass | Glass |
| Barrier rib | Polyimide | Polyimide | Polyimide | Polyimide | Polyimide | Low melting point glass | Low melting point glass |
| Barrier rib auxiliary layer (resin) | Epoxy resin A | Polyimide resin A | Siloxane resin A | Siloxane resin A | Siloxane resin A | Siloxane resin A | Siloxane resin A |
| Barrier rib auxiliary layer (solvent) | Solvent A | Solvent C | Solvent A | Solvent A | Solvent A | Solvent A | lSolvent A |
| Solution concentration (% by weight) | 25 | 25 | 25 | 25 | 25 | 5 | 35 |
| $S_C:S_P$ | 4.5:5.5 | 2.0:8.0 | 5.0:5.0 | 5.0:5.0 | 5.0:5.0 | 7.5:2.5 | 7.5:2.5 |
| $T_C:T_L$ | 10.0:0 | 3.0:7.0 | 10.0:0 | 10.0:0 | 10.0:0 | 2.0:8.0 | 3.0:7.0 |
| Phosphor | GOS:Tb Particulate | GOS:Tb Particulate | GOS:Tb Particulate | GOS:Tb Particulate | GOS:Tb Particulate | GOS:Tb Particulate | GOS:Tb Particulate |
| Binder resin | Binder resin A | Binder resin A | Binder resin B | Binder resin C | Binder resin D | Binder resin A | Binder resin A |
| Time required for emission intensity to be 1/e (μs) | 650 | 650 | 650 | 650 | 650 | 650 | 650 |
| Brightness | 125 | 110 | 140 | 138 | 137 | 105 | 108 |
| X-ray absorption rate | A | A | A | A | A | C | C |

TABLE 3

|  | Comparative Example 1 | Comparative Example 2 | Comparative Example 3 | Comparative Example 4 |
|---|---|---|---|---|
| Substrate | Polyimide film | Polyimide film | Glass | Glass |
| Barrier rib | Polyimide | Polyimide | Low melting point glass | Low melting point glass |
| Barrier rib auxiliary layer (resin) | — | Siloxane resin A | — | — |
| Barrier rib auxiliary layer (solvent) | — | solvent A | — | — |
| Solution concentration (% by weight) | — | 1 | — | — |
| $S_C:S_P$ | 0:10.0 | 0.3:9.7 | 8.0:2.0 | 5.0:5.0 |
| $T_C:T_L$ | 0:10.0 | 0.3:9.7 | 0.5:9.5 | 0.5:9.5 |
| Phosphor | GOS:Tb Particulate | GOS:Tb Particulate | GOS:Tb Particulate | GOS:Tb Particulate |
| Binder resin | Binder resin A | Binder resin A | Binder resin A | Binder resin A |
| Time required for emission intensity to be 1/e (μs) | 650 | 650 | 650 | 650 |
| Brightness | 100 | 100 | 95 | 90 |
| X-ray absorption rate | A | A | C | B |

TABLE 4

|  | Example 15 | Example 16 | Example 17 | Example 18 | Example 19 | Example 20 | Example 21 | Example 22 |
|---|---|---|---|---|---|---|---|---|
| Substrate | Polyimide film | Polyimide film | Polyimide film | Polyimide film | Polyimide film | Polyimide film | Polyimide film | Glass |
| Barrier rib | Polyimide | Polyimide | Polyimide | Polyimide | Polyimide | Polyimide | Polyimide | Low melting point glass |

TABLE 4-continued

|  | Example 15 | Example 16 | Example 17 | Example 18 | Example 19 | Example 20 | Example 21 | Example 22 |
|---|---|---|---|---|---|---|---|---|
| Barrier rib auxiliary layer (resin) | Siloxane resin A | Siloxane resin A | Epoxy resin A | Polyimide resin A | Siloxane resin A | Siloxane resin A | Siloxane resin A | Siloxane resin A |
| Barrier rib auxiliary layer (solvent) | Solvent A | Solvent A | Solvent A | Solvent C | Solvent A | Solvent A | Solvent A | Solvent A |
| Solution concentration (% by weight) | 25 | 15 | 25 | 25 | 25 | 25 | 25 | 35 |
| Sc:SP | 5.0:5.0 | 4.0:6.0 | 4.5:5.5 | 2.0:8.0 | 5.0:5.0 | 5.0:5.0 | 5.0:5.0 | 7.5:2.5 |
| Tc:TL | 10.0:0 | 8.0:2.0 | 10.0:0 | 3.0:7.0 | 10.0:0 | 10.0:0 | 10.0:0 | 3.0:7.0 |
| Phosphor | GOS:Pr Particulate | GOS:Pr Particulate | GOS:Pr Particulate | GOS:Pr Particulate | GOS:Pr Particulate | GOS:Pr Particulate | GOS:Pr Particulate | GOS:Pr Particulate |
| Binder resin | Binder resin A | Binder resin A | Binder resin A | Binder resin A | Binder resin B | Binder resin C | Binder resin D | Binder resin A |
| Time required for emission intensity to be 1/e (µs) | 3 | 3 | 3 | 3 | 3 | 3 | 3 | 3 |
| Brightness | 130 | 115 | 120 | 107 | 135 | 133 | 132 | 105 |
| X-ray absorption rate | A | A | A | A | A | A | A | C |

TABLE 5

|  | Comparative Example 5 | Comparative Example 6 | Comparative Example 7 | Comparative Example 8 |
|---|---|---|---|---|
| Substrate | Polyimide film | Polyimide film | Glass | Glass |
| Barrier rib | Polyimide | Polyimide | Low melting point glass | Low melting point glass |
| Barrier rib auxiliary layer (resin) | — | Siloxane resin A | — | — |
| Barrier rib auxiliary layer (solvent) | — | Solvent A | — | — |
| Solution concentration (% by weight) | — | 1 | — | — |
| $S_C:S_P$ | 0:10.0 | 0.3:9.7 | 8.0:2.0 | 5.0:5.0 |
| $T_C:T_L$ | 0:10.0 | 0.3:9.7 | 0.5:9.5 | 0.5:9.5 |
| Phosphor | GOS:Pr Particulate | GOS:Pr Particulate | GOS:Pr Particulate | GOS:Pr Particulate |
| Binder resin | Binder resin A | Binder resin A | Binder resin A | Binder resin A |
| Time required for emission intensity to be 1/e (µs) | 3 | 3 | 3 | 3 |
| Brightness | 100 | 100 | 95 | 90 |
| X-ray absorption rate | A | A | C | B |

DESCRIPTION OF REFERENCE SIGNS

1: Radiation detector member
2: Scintillator panel
3: Output substrate
4: Substrate
5: Barrier rib
6: Phosphor layer
7: Diaphragm layer
8: Photoelectric conversion layer
9: Output layer
10: Substrate
11: Barrier rib auxiliary layer
12: Reflective layer
13: Protective layer
14: Phosphor
15: Binder resin
S: Side of phosphor layer
T: Bottom of phosphor layer
$S_P$: Part where opposing surfaces of the reflective layer at the side of the phosphor layer are approximately parallel
$S_C$: Part where the reflective layer surrounding the side of the phosphor layer is curved
$T_L$: Part where the reflective layer at the bottom of the phosphor layer is flat
$T_C$: Part where the reflective layer at the bottom of the phosphor layer is curved

The invention claimed is:

1. A scintillator panel comprising a substrate, a grid-like barrier rib formed on the substrate, a phosphor layer in cells divided by the barrier rib, and a reflective layer surrounding the side and the bottom of the phosphor layer, the scintillator panel comprising a part where the reflective layer surrounding the side of the phosphor layer is curved and a part where opposing surfaces of the reflective layer at the side of the phosphor layer are approximately parallel, wherein a partition auxiliary layer is provided between the barrier rib and the reflective layer,
wherein a ratio in a width direction of a part where the reflective layer at the bottom of the phosphor layer is curved to a part where the reflective layer at the bottom of the phosphor layer is flat is 10.0:0 to 1.0:9.0, and a ratio in a thickness direction of the part where the reflective layer surrounding the side of the phosphor layer is curved to the part where opposing surfaces of the reflective layer at the side of the phosphor layer are approximately parallel is 0.5:9.5 to 7.0:3.0.

2. The scintillator panel according to claim 1, wherein a material constituting the barrier rib is a polymer material.

3. The scintillator panel according to claim 1, wherein a phosphor contained in the phosphor layer is powdery.

4. The scintillator panel according to claim 1, wherein the time required for an emission intensity to be 1/e times an initial emission intensity is 100 µs or less.

5. The scintillator panel according to claim 1, wherein a binder resin contained in the phosphor layer contains at least one selected from a polyester resin, a polyamide resin, a polyimide resin, a polyamideimide resin and a polyether-based resin, wherein the resin used as the material of the binder resin has an aromatic hydrocarbon group as a repeating unit in a main chain structure.

6. A radiation detector comprising the scintillator panel according to claim 1 on an output substrate including a photoelectric conversion layer.

7. A radiation inspection device comprising a radiation generating part that generates radiation and the radiation detector according to claim 6.

8. A scintillator panel according to claim 1, wherein the material constituting the reflective layer includes at least one selected from metal oxides and metals.

9. A method for producing the scintillator panel, which comprises:
   a barrier rib formation step of forming a barrier rib on a substrate to divide into cells,
   a barrier rib auxiliary layer formation step of forming a barrier rib auxiliary layer on a surface of the barrier rib,
   a reflective layer formation step of forming a reflective layer on surfaces of the barrier rib and the barrier rib auxiliary layer, and
   a phosphor filling step of filling a phosphor into the cells divided by the barrier rib,
   to obtain a scintillator panel comprising a substrate, a grid-like barrier rib formed on the substrate, a phosphor layer in cells divided by the barrier rib, and a reflective layer surrounding the side and the bottom of the phosphor layer, the scintillator panel comprising a part where the reflective layer surrounding the side of the phosphor layer is curved and a part where opposing surfaces of the reflective layer at the side of the phosphor layer are approximately parallel,
   wherein a ratio in a width direction of a part where the reflective layer at the bottom of the phosphor layer is curved to a part where the reflective layer at the bottom of the phosphor layer is flat is 10.0:0 to 1.0:9.0, and
   a ratio in a thickness direction of the part where the reflective layer surrounding the side of the phosphor layer is curved to the part where opposing surfaces of the reflective layer at the side of the phosphor layer are approximately parallel is 0.5:9.5 to 7.0:3.0.

* * * * *